US012679297B2

(12) United States Patent
Rhodes

(10) Patent No.: US 12,679,297 B2
(45) Date of Patent: Jul. 14, 2026

(54) VEHICLE TRIM RETENTION SYSTEM

(71) Applicant: FLEX-N-GATE ADVANCED PRODUCT DEVELOPMENT, LLC, Warren, MI (US)

(72) Inventor: Jeremy Rhodes, Armada, MI (US)

(73) Assignee: FLEX-N-GATE ADVANCED PRODUCT DEVELOPMENT, LLC, Warren, MI (US)

( * ) Notice: Subject to any disclaimer, the term of this patent is extended or adjusted under 35 U.S.C. 154(b) by 494 days.

(21) Appl. No.: 18/323,199

(22) Filed: May 24, 2023

(65) Prior Publication Data

US 2023/0382334 A1     Nov. 30, 2023

Related U.S. Application Data

(60) Provisional application No. 63/345,996, filed on May 26, 2022.

(51) Int. Cl.
B60R 19/24 (2006.01)
B60R 19/52 (2006.01)

(52) U.S. Cl.
CPC .............. B60R 19/24 (2013.01); B60R 19/52 (2013.01); *B60R 2019/527* (2013.01)

(58) Field of Classification Search
CPC .............. B60R 19/24; B60R 2019/527; B60R 2019/525; B60R 19/52
See application file for complete search history.

(56) References Cited

U.S. PATENT DOCUMENTS

| | | | | |
|---|---|---|---|---|
| 6,206,438 B1 * | 3/2001 | Pueyo | ................... | B60K 11/08 |
| | | | | 52/660 |
| 2007/0182174 A1 * | 8/2007 | Nakayama | .............. | B60R 19/52 |
| | | | | 293/115 |
| 2011/0204680 A1 * | 8/2011 | Fortin | ................. | B62D 25/085 |
| | | | | 296/193.1 |
| 2013/0026791 A1 * | 1/2013 | Huber | .................... | B60R 19/24 |
| | | | | 296/203.02 |
| 2016/0200273 A1 * | 7/2016 | Mohacsi | ................ | B60R 19/52 |
| | | | | 29/428 |
| 2018/0363877 A1 * | 12/2018 | Salter | ..................... | F21S 45/48 |

FOREIGN PATENT DOCUMENTS

JP         2016190540 A  * 11/2016

* cited by examiner

*Primary Examiner* — Daniel J Colilla
(74) *Attorney, Agent, or Firm* — Foley & Lardner LLP

(57) ABSTRACT

A bumper assembly includes a retention member, a front-loaded component, and a bumper shell. The retention member includes a plurality of retaining features. The front-loaded component includes a plurality of receiving members. The bumper shell is positioned substantially between the retention member and the front-loaded component. The plurality of retaining features are coupled to the plurality of receiving members such that the retention member and the front-loaded component engage the bumper shell.

18 Claims, 18 Drawing Sheets

VEHICLE TRIM RETENTION SYSTEM

CROSS-REFERENCE TO RELATED PATENT APPLICATIONS

This application claims the benefit of and priority to U.S. Provisional Patent Application No. 63/345,996, filed May 26, 2022, the entire disclosure of which is incorporated by reference herein.

BACKGROUND

The present disclosure relates generally to the field of vehicle bumpers. More specifically, the present disclosure relates to structures for coupling a front-loaded component (e.g., lower grille texture, fog bezel, applique, etc.) to a bumper.

Bumpers typically extend widthwise across the front and rear of a vehicle. Some bumpers allow for attachment of various plastic components, including front-loaded components, for functional and/or stylistic reasons. Such bumpers may be referred to as a bumper shell. Front loaded components may be attached or removed from bumper shells.

SUMMARY

At least one embodiment of the present disclosure relates to a bumper assembly. The bumper assembly includes a retention member, a bumper shell, and a front-loaded component. The retention member includes a number (e.g., one or more, a plurality, etc.) of retaining features. The front-loaded component includes a number of receiving members. The bumper shell is positioned substantially between the retention member and the front-loaded component. The number of retaining features is coupled to the number of receiving members such that the retention member and the front-loaded component engage the bumper shell.

At least one embodiment of the present disclosure relates to a method of assembling a bumper assembly. The method includes providing a retention member that includes a number of retaining features. The method further includes providing a front-loaded component that includes a number of receiving members. The method further includes providing a bumper shell, applying the retention member to a rear face of the bumper shell, applying the front-loaded component to a front face of the bumper shell, and coupling the receiving members to the retaining features, such that the front-loaded component engages the front face of the bumper shell, the retaining member engages the rear face of the bumper shell, and the bumper shell is held substantially between the retaining member and the front-loaded component.

At least one embodiment of the present disclosure relates to a retention member for coupling a front-loaded component to a bumper shell. The retention member includes a number of retaining features, an upper profile, and a lower profile. The upper profile is configured to engage a rear upper surface of the bumper shell and the lower profile is configured to engage a rear lower surface of the bumper shell. The retaining features are configured to engage receiving members coupled to the front-loaded component such an upper surface of the front-loaded component engages a front upper surface of the bumper shell and a lower surface of the front-loaded component engages a front lower surface of the bumper shell. The retention member holds the front-loaded component against the bumper shell.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

DETAILED DESCRIPTION

Figure 1:
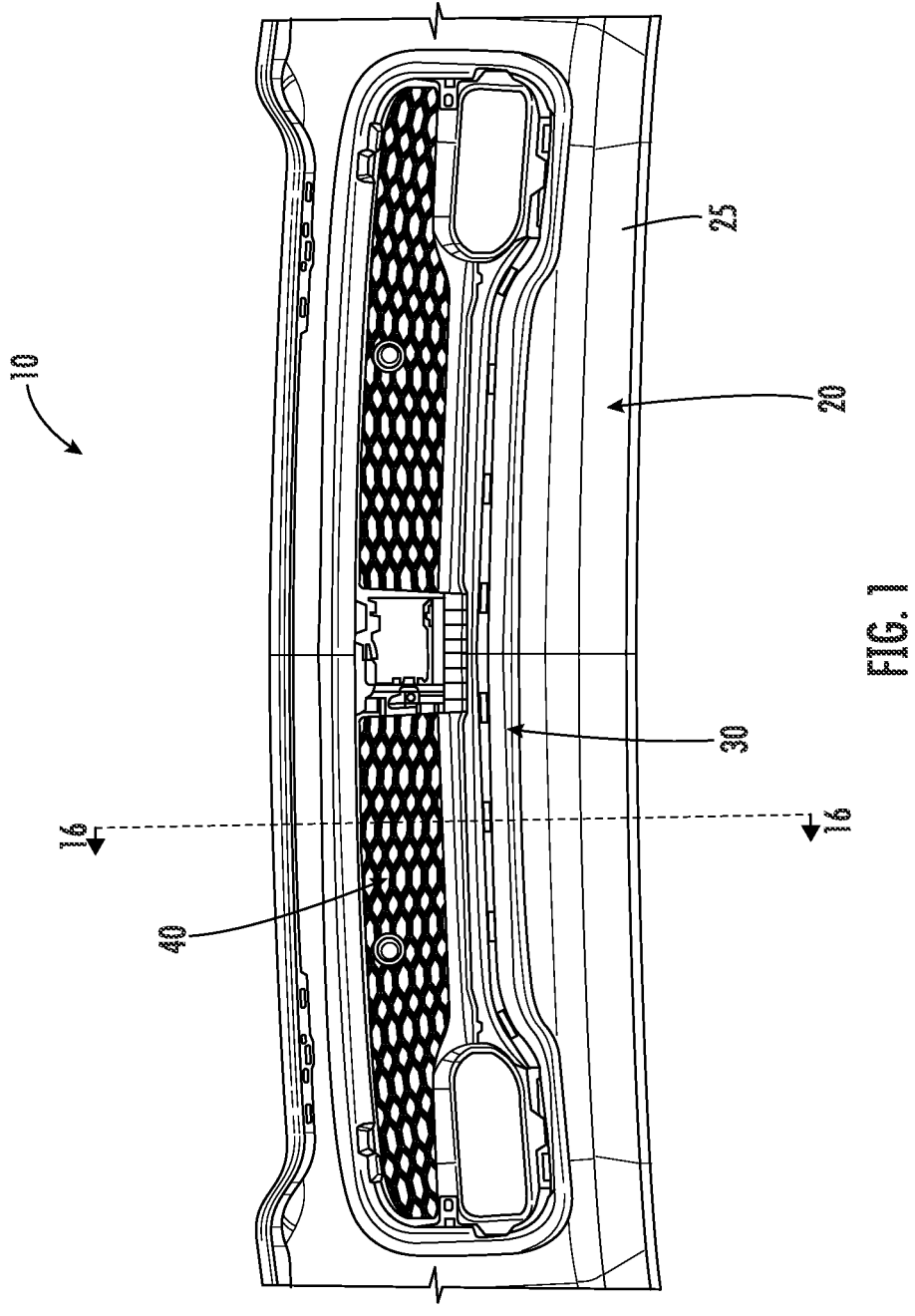
FIG. 1 is a rear view of a bumper assembly, according to an exemplary embodiment.

Before turning to the FIGURES, which illustrate the example embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates to vehicle bumpers, including, but not limited to, structures or elements intended to allow for coupling a front-loaded component to a bumper shell. The bumper shell may be a pre-formed thin-walled member formed as a one-piece construction. The bumper shell may be formed to include an outer region to face outward from a vehicle (therefore visible to an observer) and an inner region to interface with a vehicle. In some designs, the bumper shell may be formed to receive a front-loaded component. In some embodiments, the front-loaded component is a plastic component. The front-loaded component may be a plastic component, specifically a Class-A plastic component.

Typically, the front-loaded component is attached to the bumper shell using mechanical fasteners (e.g., studs, nuts, or metal clips) which fix the front-loaded component to the bumper shell. Such designs result in various costs and labor associated with fixing the front-loaded component to the bumper shell. For example, such designs may require labor and floor space associated with the pre-assembling of various mechanical fasteners to the front-loaded component, forming a sub-assembly including the mechanical fasteners and the front-loaded component, and assembling the sub-assembly to the bumper shell. As another example, such designs may require additional tooling (beyond the generic construction of the front-loaded component and the bumper shell) to produce features in the front-loaded component and bumper shell that may receive and/or retain the mechanical fasteners. Beyond additional costs and labor, typical designs may experience certain functional issues. For example, where the bumper shell interfaces with mechanical fasteners, potential rust spots may result. As another example, the use of mechanical fasteners may result in various areas, in between points at which the various mechanical fasteners fix the front-loaded component to the bumper shell, where the front-loaded component is not securely held against the bumper shell. Such gaps may result in friction between the front-loaded component and the bumper shell during movement of the vehicle, allow build-up of debris and residue, and other functional issues. Accordingly, it would be advantageous to provide an improved configuration for such structures/features in order to avoid the various issues regarding costs, labor, and function. For example, it would be advantageous to employ structures in the bumper shell/front-loaded component assembly that avoid the use of mechanical fasteners and ensure a constant engagement between the bumper shell and front-loaded component. These and other advantages will be apparent to those reviewing the present disclosure.

Various embodiments disclosed herein relate to a retention member (e.g., ring, liner, interface, etc.) that can be used to attach a front-loaded component to a bumper shell by providing a number of retaining features to engage with receivers on the front-loaded component. The retention member may be used in an assembly that includes the bumper shell and the front-loaded component. According to various embodiments described herein, one or both of the bumper shell and the front-loaded component may be specifically constructed to be assembled in conjunction with the retention member. The retention member may generally be assembled to the bumper shell on a rear face of the bumper shell (e.g., a back side, a first side, a side facing the vehicle to which the bumper shell would be attached, etc.) and the front-loaded component may generally be assembled to the bumper shell on a front face of the bumper shell (e.g., a second side, a side facing away from the vehicle to which the bumper shell would be attached, etc.).

As will be described in greater detail below, the various features and resulting assembly operation of the retention member may allow the retention member to engage the bumper shell and the front-loaded component such that the bumper shell, front-loaded component, and the retention ring are held in place relative to one another. Accordingly, the resulting assembly may be attached to a vehicle as a substantially complete bumper assembly for use on the vehicle. In some embodiments, the resulting assembly may is configured without a need to use any direct mechanical fasteners. Accordingly, the various systems and methods described herein may advantageously reduce costly tooling, labor, and floor space requirements associated with the process of assembling a typical bumper shell to a typical front-loaded component. Such tooling and labor advantages may ultimately lead to reduced assembly times in a manufacturing process. Moreover, without the need for direct mechanical fasteners, and as described in greater detail below, the front-loaded component may be positioned in the bumper assembly such that a constant pressure is provided around the perimeter of the front-loaded component where the front-loaded component engages the remaining components of the bumper assembly (e.g., the retention member and the bumper shell). Such constant pressure presents various visual and functional advantages including a reduction in visual gaps between the front-loaded component and the remaining components of the bumper assembly, less friction between the front-loaded component and the remaining components of the bumper assembly, and less potential for rust, debris, and other wear-and-tear. Such various functional advantages may reduce issues surrounding warranties issued in regards to bumper assemblies.

In one embodiment, a bumper assembly includes a retention member, a bumper shell, and a front-loaded component. The retention member may be an oblong ring forming an annular channel (e.g., a curved channel, a recession, a depression, etc.), an annular profile (e.g., a skirt, a trim, etc.), and a lower lip. The annular profile may engage a rear face of an upper trim of the bumper shell and a rear face of a lower profile of the front-loaded component. The annular channel may form a number of retaining features that interface with a number of receiving fingers formed by the front-loaded component, thereby holding the front-loaded component in place relative to the retaining ring. The upper trim of the bumper shell and a lower trim of the bumper shell may be at least partially disposed between the front-loaded component and the retention ring. Specifically, the front-loaded component may include an upper edge and a lower edge. The upper edge of the front-loaded component may engage a front face of the upper trim of the bumper shell, thereby holding the upper trim of the bumper shell against the annular profile. The lower edge may engage the lower trim of the bumper shell, thereby holding the lower trim of the bumper shell against the annular profile. The lower lip of the retention ring may engage a rear face of the front-loaded component for additional support and rigidity of bumper assembly. Accordingly, the bumper shell may be coupled to the front-loaded component using the retention member to form the bumper assembly. Further, the arrangement of the retaining features and corresponding receiving fingers may allow for a generally consistent pressure to be applied between the bumper shell and the front-loaded component.

Referring now generally to the FIGURES, a bumper assembly 10 is shown according to various embodiments. The bumper assembly 10 is configured for use in vehicles, outdoor equipment, etc. The bumper assembly 10 includes a bumper shell 20, a retention member 30, and a front-loaded component 40. As described in greater detail below, the retention member may engage the front-loaded component 40 and the bumper shell 20 so as to couple the front-loaded component 40 to the bumper shell 20.

Referring to FIG. 1, a rear view of a bumper assembly 10 is shown according to an example embodiment. The bumper assembly 10 may include a bumper shell 20, a retention member 30, and a front-loaded component 40. The retention member 30 may be generally disposed between the bumper shell 20 and the front-loaded component 40 and be configured to couple to the bumper shell 20 and the front-loaded component 40, thus coupling the bumper shell 20 to the front-loaded component 40. The bumper shell 20 may form a central aperture. The front-loaded component 40 may be positioned substantially within the central aperture of the bumper shell 20 and the retention member 30 may be positioned substantially about the perimeter of the central aperture of the bumper shell 20. It should be noted that while one particular physical configuration for the bumper assembly 10 and its various components is illustrated herein, any of a variety of different configurations (size, shape, etc.) may be possible according to various other exemplary embodiments, and are considered to be within the scope of the present disclosure.

Figure 2:
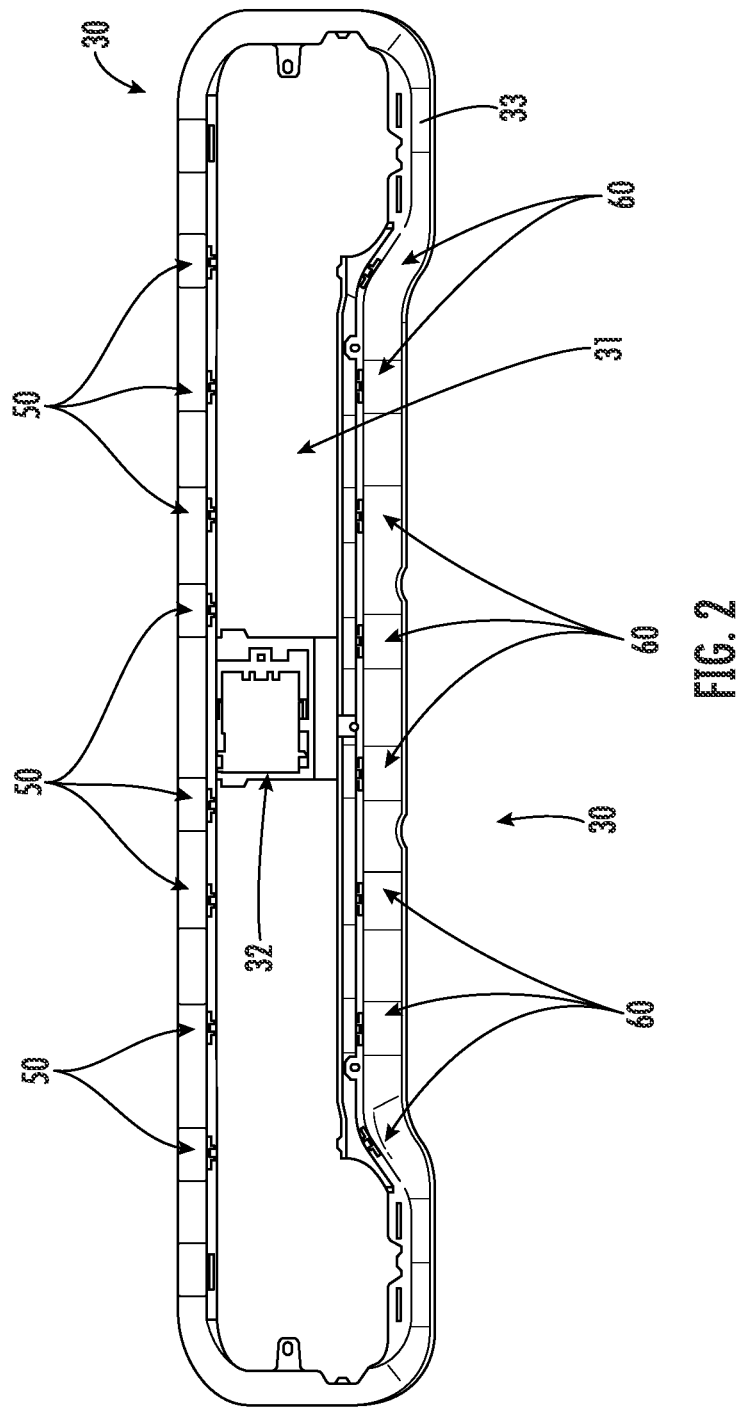
FIG. 2 is a front view of the retention member from the bumper assembly of FIG. 1, according to an exemplary embodiment.

Referring to FIG. 2, a front perspective view of the retention member 30 is shown, according to an exemplary embodiment. The retention member 30 may form a substantially oblong and/or annular shape and include upper retaining features 50, lower retaining features 60, a central aperture 31, and a brace member 32. The brace member may extend vertically between a lower portion of the retention member 30 and an upper portion of the retention member 30. The retention member 30 may include a front face 33 and a rear face 34 (depicted in FIGS. 4 and 5). In some embodiments, the retention member 30 may be formed as a single component. For example, the retention member 30 may be constructed via injection molded as a single, monolithic piece. As another example, the retention member 30 may be constructed by way of additive manufacturing. In other embodiments, the retention member 30 may be formed as an assembly of two or more components. The retention member 30 may be made of any suitable material including, but not limited to, plastic, rubber, fiberglass, carbon fiber, and other materials. The retention member 30 may be configured to be at least partially flexible or subject to deflection, which may advantageously facilitate the various systems and methods regarding assembly of the bumper assembly 10 as provided herein. Nonetheless, the retention member 30 may be configured to provide sufficient rigidity to facilitate the structural integrity of the complete bumper assembly 10 as provided herein.

Figure 3A:
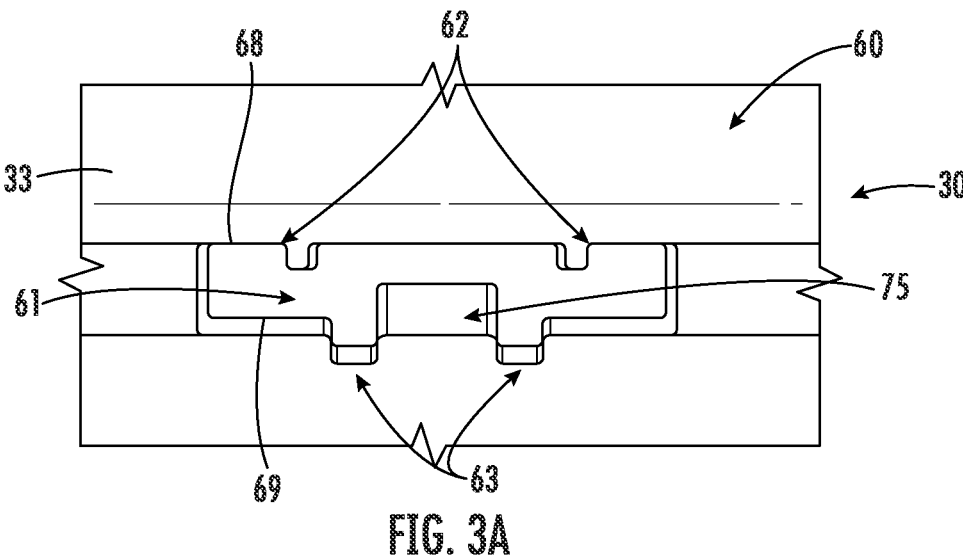
FIG. 3A is a detailed front view of a retaining feature of the retention member of FIG. 2, according to an exemplary embodiment.
Figure 3B:
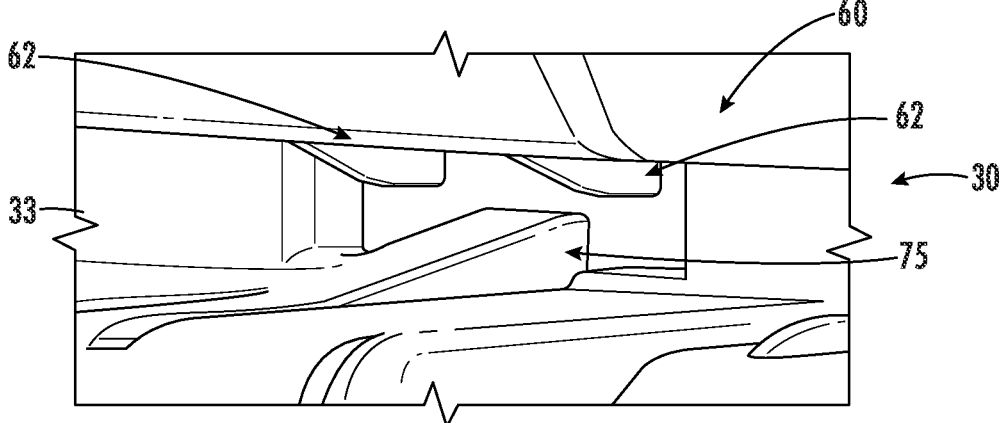
FIG. 3B is a detailed perspective view of a retaining feature of the retention member of FIG. 2, according to an exemplary embodiment.
Figure 3C:
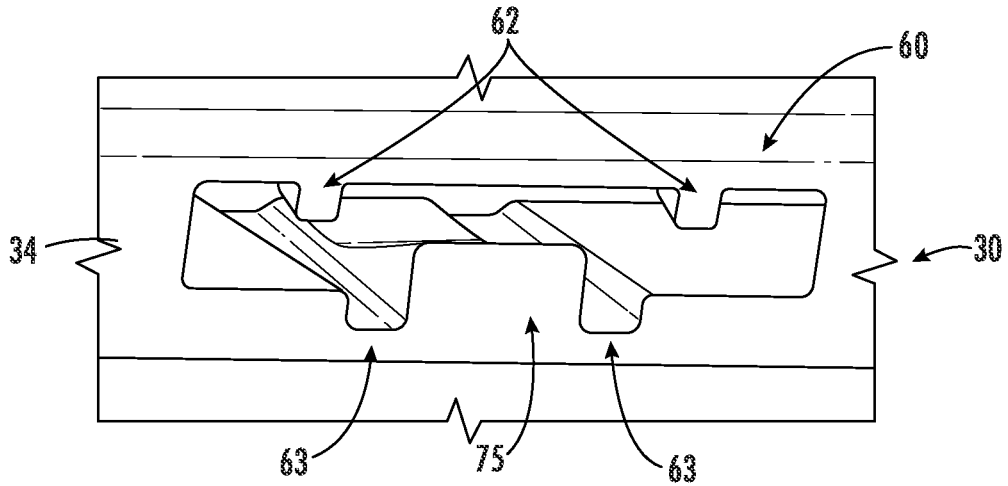
FIG. 3C is a detailed rear perspective view of a retaining feature of the retention member of FIG. 2, according to an exemplary embodiment.

Referring to FIGS. 3A, 3B, and 3C, one of the lower retaining features 60 is shown, according to an exemplary embodiment. FIG. 3A shows a front view of the lower retaining feature 60, FIG. 3B shows a front perspective view of the lower retaining feature 60, and FIG. 3C shows a rear perspective view of the lower retaining feature 60. In some embodiments, the lower retaining feature 60 includes an aperture 61, upper protrusions 62, lower channels 63, and a barb 75. The aperture 61 may form a number of perimeter surfaces, including an upper surface 68 and a lower surface 69. The upper protrusions 62 may extend downward from the upper surface 68 into the aperture 61. The upper protrusions 62 may form a gradually protruding profile beginning towards the front face 33 of the retention member 30 and gradually increasing in protrusion towards the rear face 34 of the retention member 30. The barb 75 may extend upward from the lower surface 69 into the aperture 61. The barb 75 may form a gradually protruding profile beginning towards the front face 33 of the retention member 30 and gradually increasing in protrusion towards the rear face 34 of the retention member 30. The lower channels 63 may cut into the lower surface 69 and extend from the front face 33 of the retention member 30 to the rear face 34 of the retention member 30. The barb 75, upper protrusions 62, and lower channels 63 may form various curved surfaces to facilitate the various functions of assembling the bumper assembly 10 described herein. In some embodiments, the barb 75 and upper protrusions 62 may form a substantially flat surface parallel to the rear face 34 of the retention member 30. As will be described in greater detail below in regards to FIG. 16, the various features of the lower retaining feature 60 may be used to engage a receiving finger, such as a lower receiving finger 90 depicted in FIG. 7, in order to couple the retention member 30 to the front-loaded component 40.

Still referring to FIGS. 3A, 3B, and 3C, with additional reference to FIG. 2, the upper retaining features 50 depicted in FIG. 2 may be formed in a manner substantially similar to that of the lower retaining features 60 as depicted in FIGS. 3A, 3B, 3C and include similar features. In some embodiments, the upper retaining features 50 are mirror images of the lower retaining features 60, such that the barb 75, as depicted in FIG. 3A, when implemented on the upper retaining features 50, protrudes downward from the upper surface 68 instead of upward from the lower surface 69. Similarly, the upper protrusions 62, when implemented on the upper retaining features 50, may protrude upward from the lower surface 69 instead of protruding downward from the upper surface 68. Further, the lower channels 63, when implemented on the upper retaining features 50, may cut upward into the upper surface 68 instead of downward into the lower surface 69.

Figure 4:
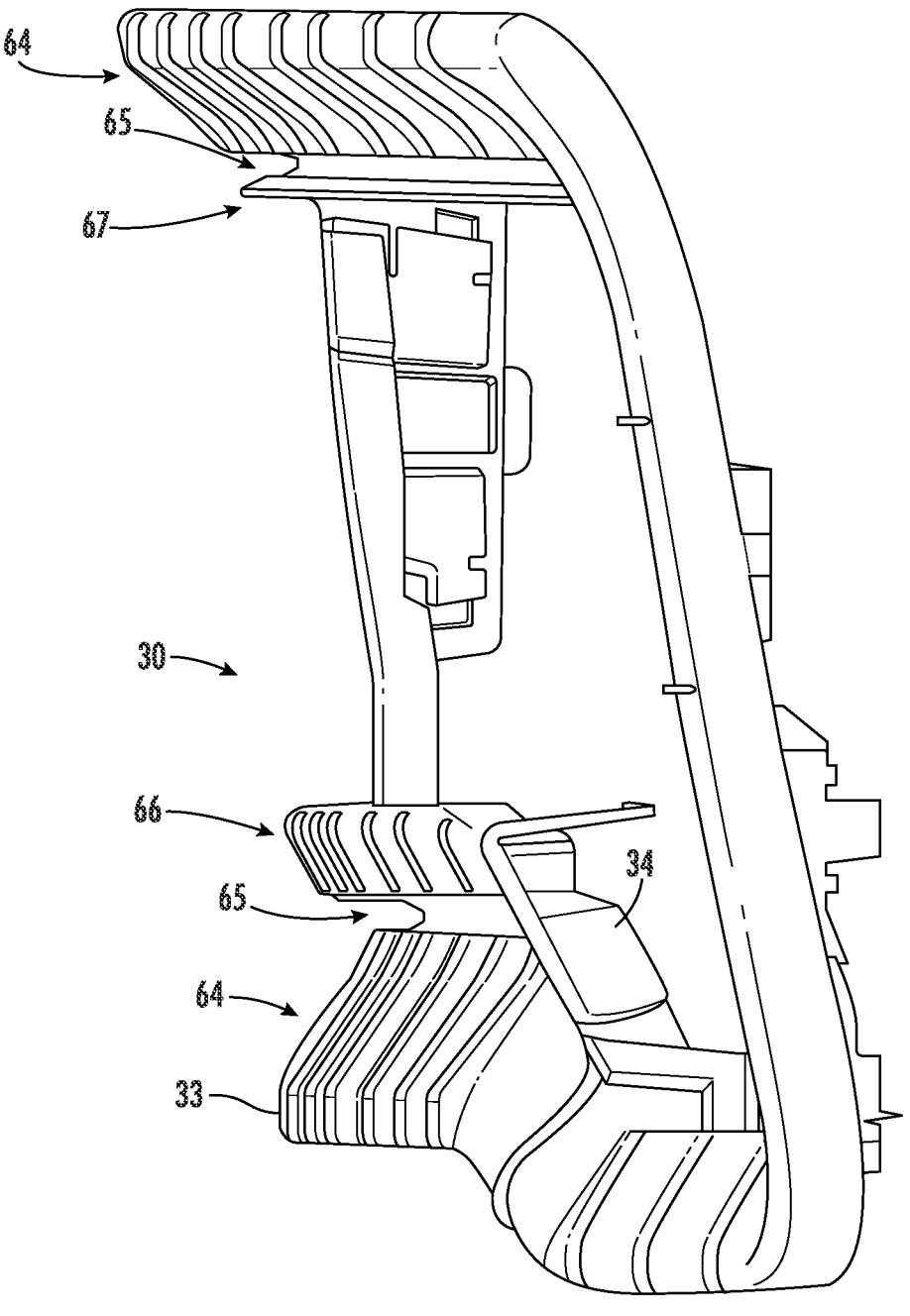
FIG. 4 is a side view of the retention member of FIG. 1, according to an exemplary embodiment.

Referring to FIG. 4, a side perspective view of the retention member 30 is shown, according to an exemplary embodiment. In some embodiments, the retention member 30 includes an annular profile 64, an annular channel 65, an upper lip 67, and a lower lip 66. The annular profile 64 may be disposed at the radially outer perimeter of the retention member 30 and extend continuously about the entire perimeter of the retention member 30. In some embodiments, the annular profile 64 is separated into a lower portion and an upper portion extending horizontally across an upper portion of the retention member 30 and a lower portion of the retention member 30, respectively. The annular profile 64 may form a substantially curved surface, resulting in a profile on the front face 33 that substantially matches a trim portion of a rear face formed by the bumper shell 20 so as to engage the bumper shell 20, as described in greater detail below in regards to FIGS. 11, 12 and 16. In some embodiments, the annular profile 64 may form ribs protruding from the front face 33 of the retention member 30 in order to provide an improved engagement between the surface of the annular profile 64 and the trim portion of the rear face formed by the bumper shell 20. In other embodiments, the annular profile 64 forms a smooth surface on the front face 33 of the retention member 30. In other embodiments still, the annular profile 64 may be configured to include various adhesives to provide enhanced engagement between the annular profile 64 and the trim portion of the rear face formed by the bumper shell 20.

Still referring to FIG. 4, the annular channel 65 is disposed radially inward form the annular profile 64. As shown, the annular channel 65 forms a recession disposed radially inward from the annular profile 64 and radially outward from the upper lip 67. The recession formed by the annular channel 65 may extend from the front face 33 of the retention member 30 towards the rear face 34 of the retention member 30. As shown in greater detail below in regards to FIGS. 5 and 6, the annular channel 65 may include the lower retaining features 60. Similarly, the annular channel 65 may include the upper retaining features 50. In some embodiments, the annular channel 65 is divided into two discontinuous sections, resulting in an upper section that includes the upper retaining features 50 and a lower section that includes the lower retaining features 60.

Still referring to FIG. 4, the upper lip 67 may extent horizontally across an upper portion of the retention member 30, according to some embodiments. The upper lip 67 may be disposed radially inward from the annular profile 64 and the annular channel 65. Thus, in some embodiments, the upper lip 67 is disposed below the annular channel 65 to partially form the recession of the annular channel 65 in conjunction with the annular profile 64. In some embodiments, the upper lip 67 forms a continuous profile with the lower lip 66 to extend continuously about the retention member 30. The upper lip 67 may protrude from the front face 33 of the retention member 30 away from the rear face 34 of the retention member 30 and form a thin shelf profile that may engage with and provide vertical support for the front-loaded component 40. Specifically, in some embodiments, an upper face of the upper lip 67 may engage a lower face of a similarly profiled protrusion extending from the front-loaded component 40, as described in greater detail below in regards to FIG. 9A.

Still referring to FIG. 4, the lower lip 66 may extend horizontally across a lower portion of the retention member 30, according to some embodiments. The lower lip 66 may be disposed radially inward form the annular channel 65 and the annular profile 64. Thus, in some embodiments, the lower lip 66 is disposed above the annular channel 65 to partially form the recession of the annular channel 65 in conjunction with the annular profile 64. In some embodiments, the lower lip 66 forms a continuous profile with the upper lip 67 to extend continuously about the retention member 30. The lower lip 66 may form a substantially curved surface, resulting in a profile on the front face 33 of the retention member 30 that substantially matches a lower profile of a rear face formed by the front-loaded component 40, as described in greater detail below in regards to FIGS. 9A and 16. In some embodiments, the lower lip 66 may form ribs protruding from the front face 33 of the retention member 30 in order to provide an improved engagement between the surface of the lower lip 66 and the lower profile of a rear face formed by the front-loaded component 40. In other embodiments, the lower lip 66 forms a smooth surface on the front face 33 of the retention member 30. In other embodiments still, the lower lip 66 may be configured to include various adhesives to provide enhanced engagement between the lower lip 66 and the lower profile of a rear face formed by the front-loaded component 40.

Figure 5:
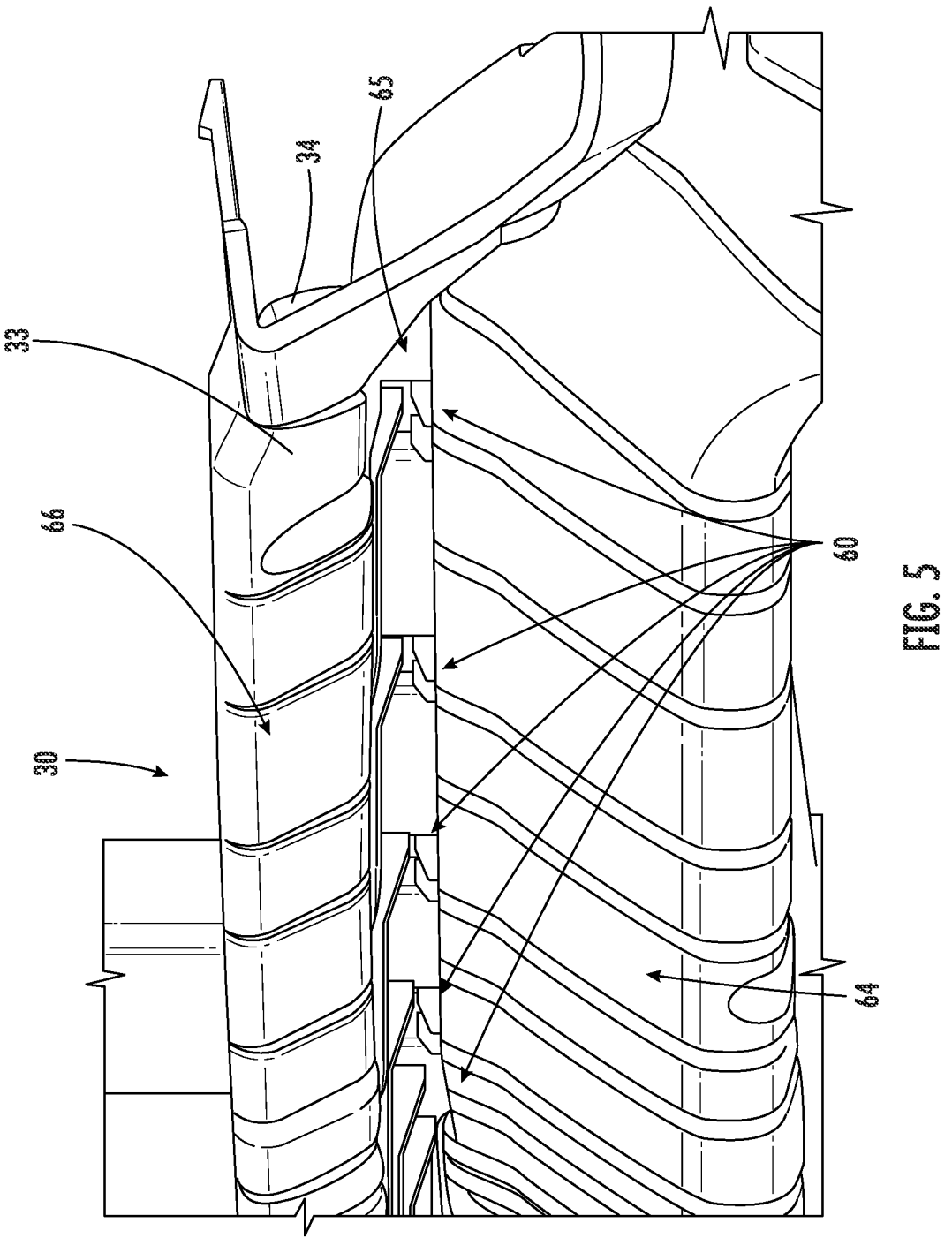
FIG. 5 is a side perspective view of the retention member of FIG. 1, according to an exemplary embodiment.

Referring to FIG. 5, a detailed perspective view of the retention member 30 is shown, according to an exemplary embodiment. As shown, the upper retaining features 60 may be disposed within a recession formed by the annular channel 65, as described in greater detail above in regards to FIG. 4.

Figure 6:
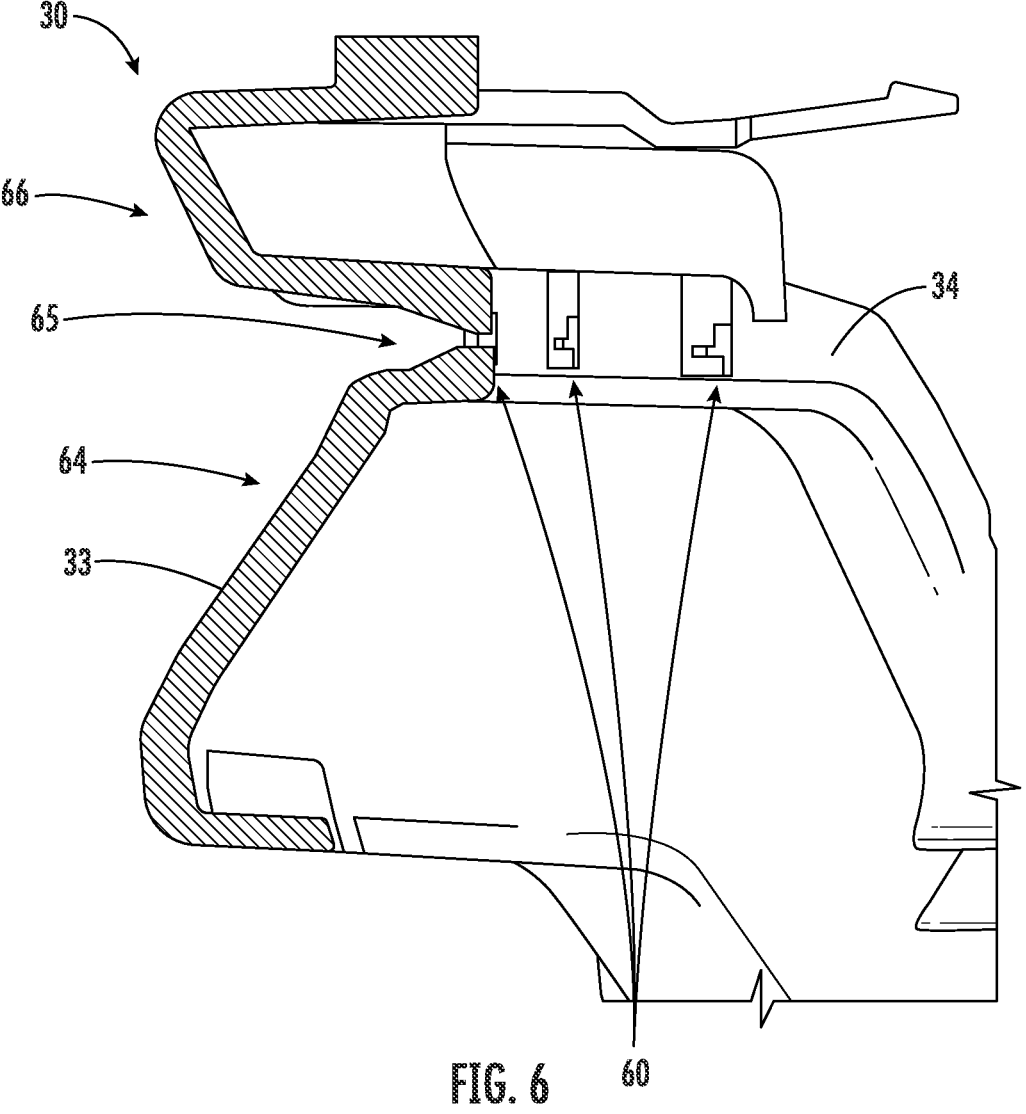
FIG. 6 is a side cross-sectional view of the retention member of FIG. 1, according to an exemplary embodiment.

Referring to FIG. 6, a side cross-sectional view of the retention member 30 is shown, according to an exemplary embodiment. As shown, retention member 30, and specifically the annular profile 64, lower lip 66, and annular channel 65 may be a thin-walled structure. As shown, the annular channel 65 may form a substantially flat surface on the rear face 34 of the retention member 30.

Figure 7:
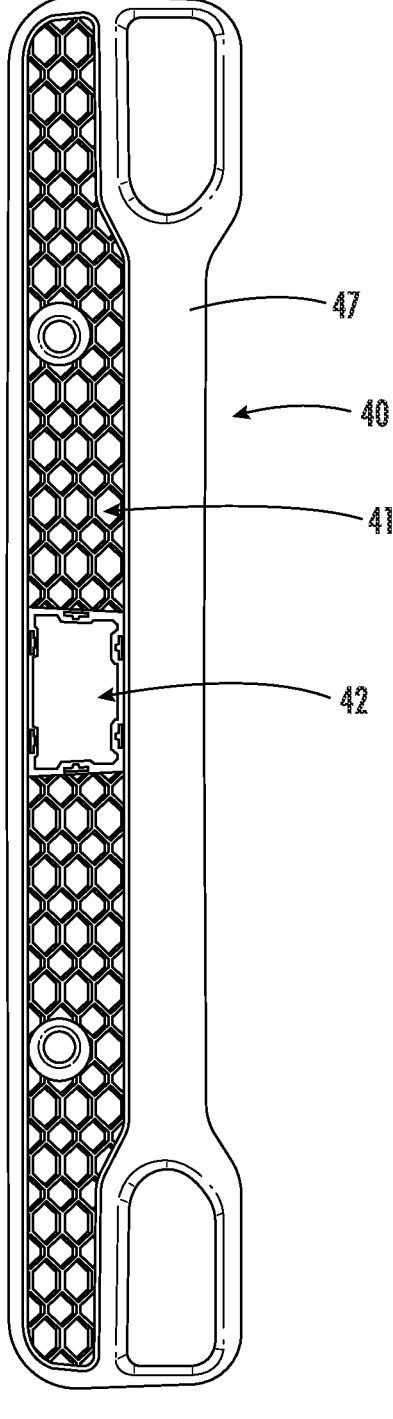
FIG. 7 is a front view of the front-loaded component of FIG. 1, according to an exemplary embodiment.

Referring to FIG. 7, a front perspective view of the front-loaded component 40 is shown, according to an exemplary embodiment. In various embodiments, the front-loaded component is a member configured to be coupled to the exterior of a vehicle. Accordingly, in some embodiments, the front-loaded component 40 may be a lower grille texture. In other embodiments, the front-loaded component 40 may be a bezel. In other embodiments still, the front-loaded component 40 may generally be an applique (e.g., a decorative member or cover which is fastened to a vehicle surface to add styling and/or to functionally cover aesthetically non-pleasing portions of the vehicle). In some embodiments, the front-loaded component 40 is a Class-A Plastic Component. In other words, the front-loaded component 40 may include a finish that features attributes (e.g., flatness, smoothness, light reflection, etc.) similar to typical metal features coupled to the exterior of vehicles. In some embodiments, the front-loaded component may be formed as a single component. For example, the front-loaded component 40 may be constructed via injection molded as a single, monolithic piece. As another example, the front-loaded component 40 may be constructed by way of additive manufacturing. In other embodiments, the front-loaded component 40 may be formed as an assembly of two or more components. The front-loaded component 40 may be made of any suitable material including, but not limited to, plastic, rubber, fiberglass, carbon fiber, steel, and other materials. The front-loaded component 40 may be configured to be at least partially flexible or subject to deflection, which may advantageously facilitate the various systems and methods regarding assembly of the bumper assembly 10 as provided herein. Nonetheless, the front-loaded component 40 may be configured to provide sufficient rigidity to facilitate the structural integrity of the complete bumper assembly 10 as provided herein. Although the front-loaded component 40 is generally depicted as a grille texture herein, it should be appreciated that the systems and method provided herein may be applicable to any sort of additive component to be coupled to a bumper shell. For example, the systems and methods provided herein may be equally applicable to coupling a headlight cover or exhaust bezel to a properly shaped interface on a bumper shell. Accordingly, while shown in an elongated shape, the front-loaded component 40 may be formed in any geometrical configuration suitable to be coupled to the front of a vehicle.

Still referring to FIG. 7, the front-loaded component 40 includes a grille texture 41 and a central aperture 42, according to some embodiments. The central aperture 42 may receive some or all of the brace member 32 of the retention member 30. The front-loaded component may include a front face 47 and a rear face 48 (depicted in FIGS. 9A, 9B, and 9C).

Figure 8A:
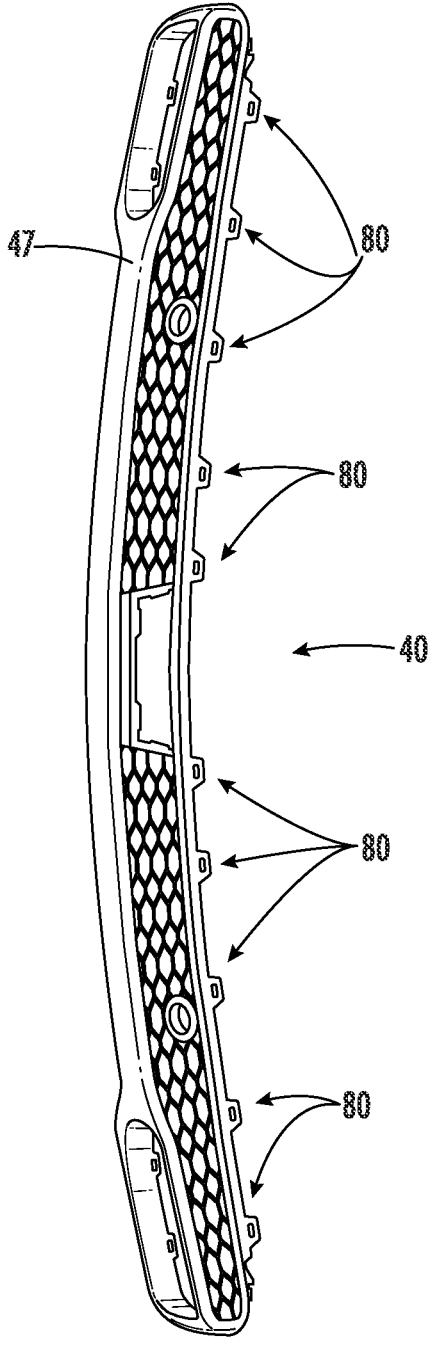
FIG. 8A is an upper perspective view of the front-loaded component of FIG. 1, according to an exemplary embodiment.

Referring to FIG. 8A, an upper perspective view of the front-loaded component 40 is shown, according to an exemplary embodiment. In some embodiments, the front-loaded component 40 includes upper receiving fingers 80.

Figure 8B:
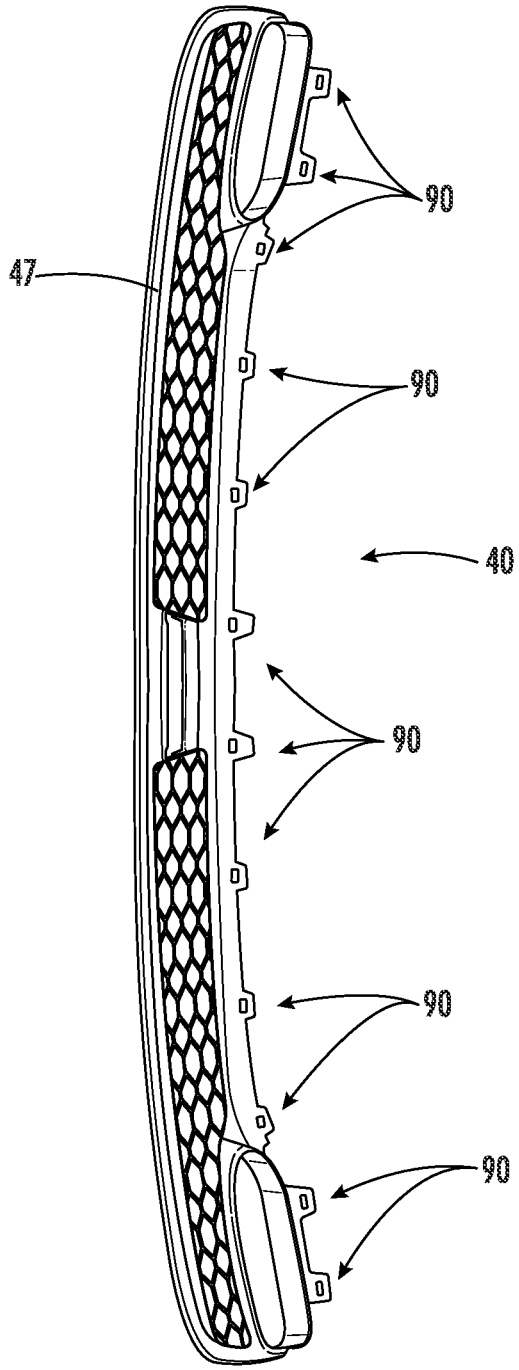
FIG. 8B is a lower perspective view of the front-loaded component of FIG. 1, according to an exemplary embodiment.

Referring to FIG. 8B, a lower perspective view of the front-loaded component 40 is shown, according to an exemplary embodiment. In some embodiments, the front-loaded component 40 includes lower receiving fingers 90.

Figure 9A:
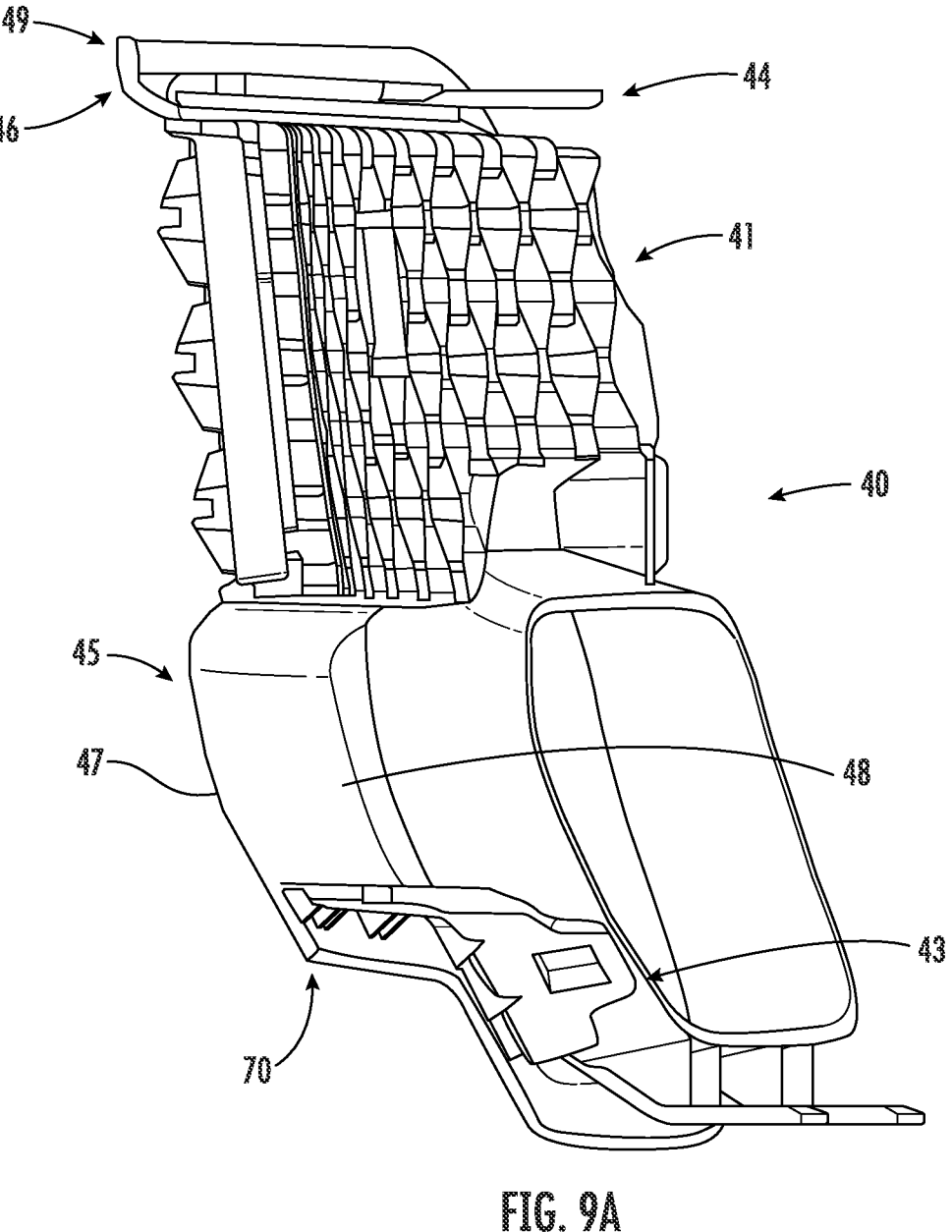
FIG. 9A is a side cross-sectional view of the front-loaded component of FIG. 1, according to an exemplary embodiment.

Referring to FIG. 9A, a side cross-sectional view of the front-loaded component 40 is shown, according to an exemplary embodiment. In some embodiments, the front-loaded component 40 includes an upper profile 46 and a lower profile 45. The front-loaded component 40 may include an upper protrusion 44 extending from the rear face 48 of the front-loaded component 40 and away from the front face 47 of the front-loaded component 40. The upper protrusion 44 may extend from the upper profile 46 and be vertically disposed between an upper edge 49 and the grille texture 41. The front-loaded component 40 may include a lower protrusion 43 extending from the rear face 48 of the front-loaded component 40 and away from the front face 47 of the front-loaded component 40. The lower protrusion may extend from the lower profile 45 and be vertically disposed between a lower edge 70 and the grille texture 41. In some embodiments, the upper profile 46 may form the upper edge 49 to engage with a trim portion of a rear face formed by the bumper shell 20, as described in greater detail below in regards to FIG. 16. In some embodiments, the lower profile 45 forms a profile that substantially matches the profile of the lower lip 66 of the retention member 30 so as to engage the retention member 30, as described in greater detail below in regards to FIG. 16. In some embodiments, the lower profile 45 forms the lower edge 70 to engage a lower trim line of the bumper shell 20, as described in greater detail below in regards to FIGS. 11, 12 and 16.

Figure 9B:
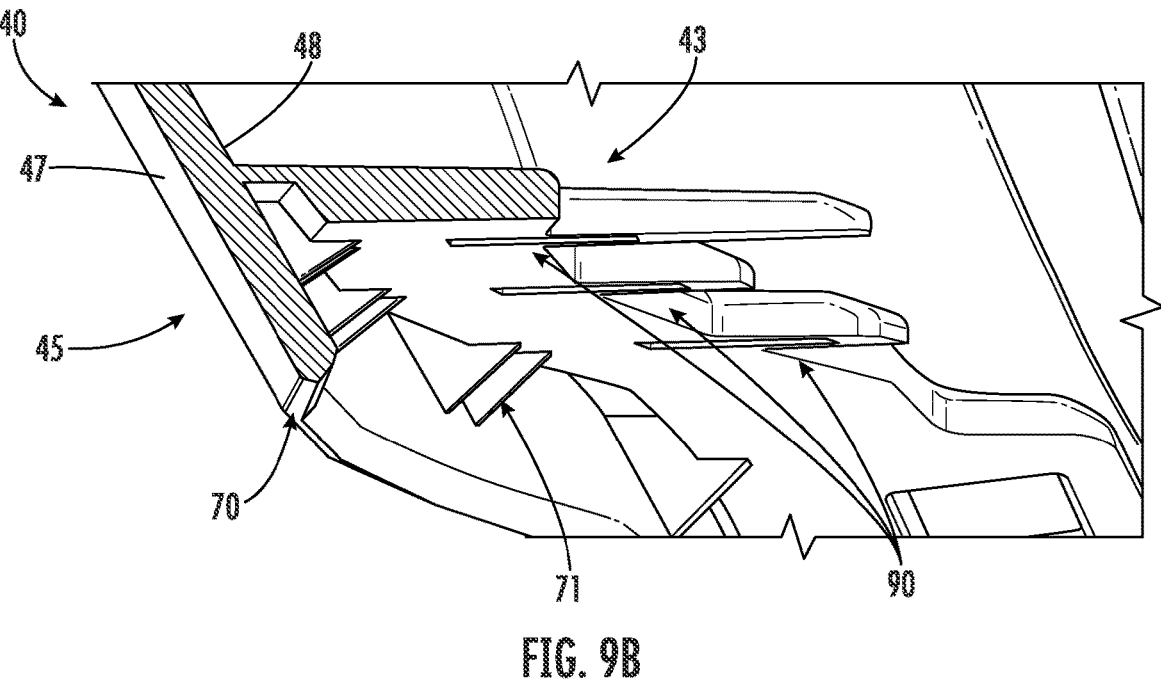
FIG. 9B is a detailed side cross-sectional view of the front-loaded component of FIG. 1, according to an exemplary embodiment.

Referring to FIG. 9B, a side-cross sectional view of the lower profile 45 of the front-loaded component 40 is shown, according to an exemplary embodiment. As shown, the lower protrusion 43 may form the lower receiving fingers 90. The lower receiving fingers 90 may be formed substantially parallel to the upper protrusion 44. In some embodiments, the lower profile may form one or more finned protrusions 71 extending from the lower profile 45 of the front-loaded component 40 and away from the front face 47 of the front-loaded component 40. The finned protrusions may be formed to provide a support between the lower profile 45 and the lower protrusion 43.

Figure 9C:
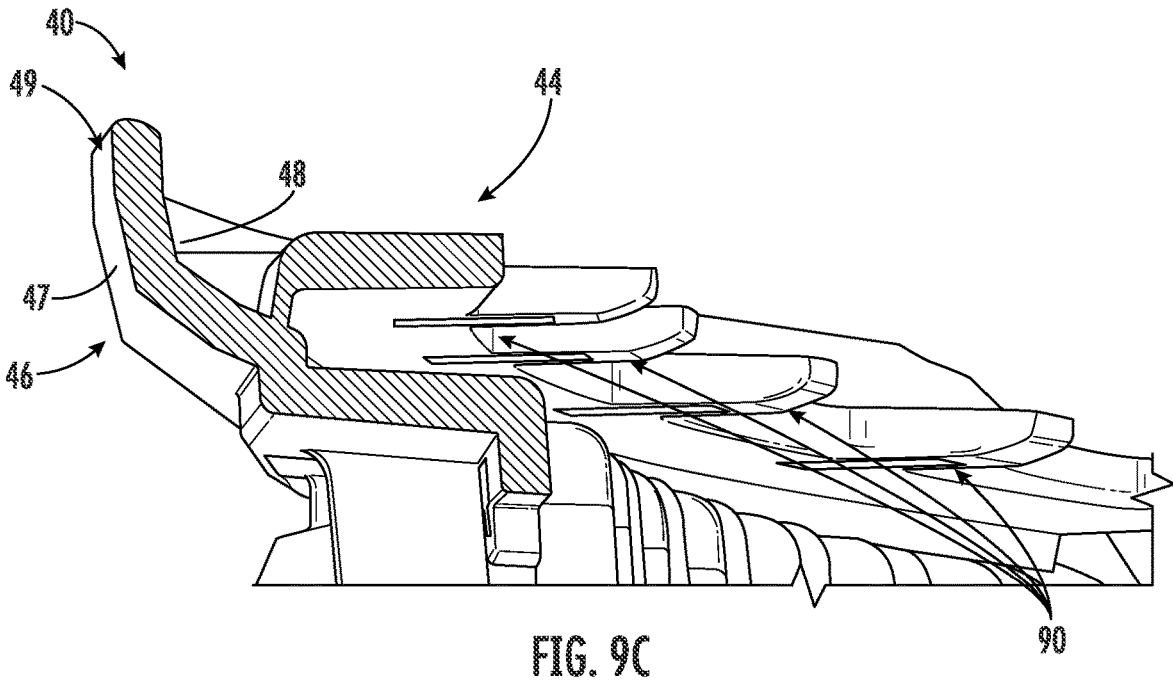
FIG. 9C is a detailed side cross-sectional view of the front-loaded component of FIG. 1, according to an exemplary embodiment.

Referring to FIG. 9C, a side-cross sectional view of the upper profile 46 of the front-loaded component 40 is shown, according to an exemplary embodiment. As shown, the upper protrusion 44 may form the upper receiving fingers 90. The upper receiving fingers 80 may be formed substantially parallel to the upper protrusion 44.

Figure 10A:
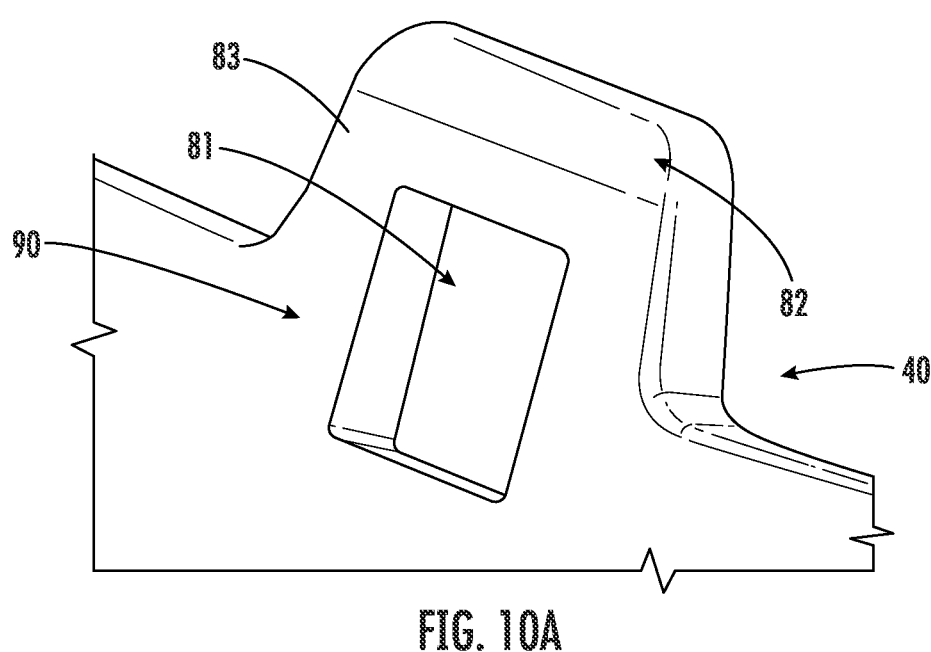
FIG. 10A is an upper perspective view of a receiving finger of the front-loaded component of FIG. 7, according to an exemplary embodiment.
Figure 10B:
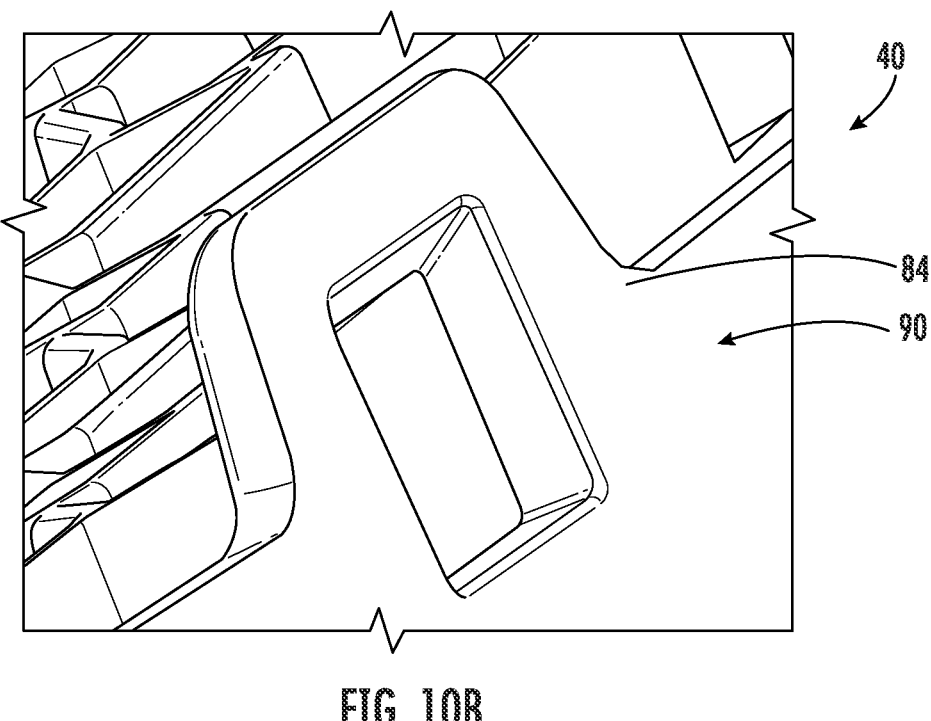
FIG. 10B is a lower perspective view of a receiving finger of the front-loaded component of FIG. 7, according to an exemplary embodiment.

Referring to FIGS. 10A and 10B, one of the lower receiving fingers 90 is shown, according to various embodiments. FIG. 10A shows a lower perspective view of the lower receiving finger 90, according to an exemplary embodiment. FIG. 10B shows an upper perspective view of the lower receiving finger 90, according to an exemplary embodiment. The lower receiving finger 90 may include an aperture 81 and a chamfer tip 82, an upper surface 83, and a lower surface 84. As described in greater detail below, the configuration of the lower receiving fingers 90 may facilitate the systems and methods provided herein by engaging with the lower retaining features 60. Although not depicted, the upper receiving fingers 80 may be configured in a manner substantially similar to that of the lower receiving fingers 90. In some embodiments, the upper receiving fingers 80 may be a mirror image of the lower receiving fingers 90.

Figure 11:
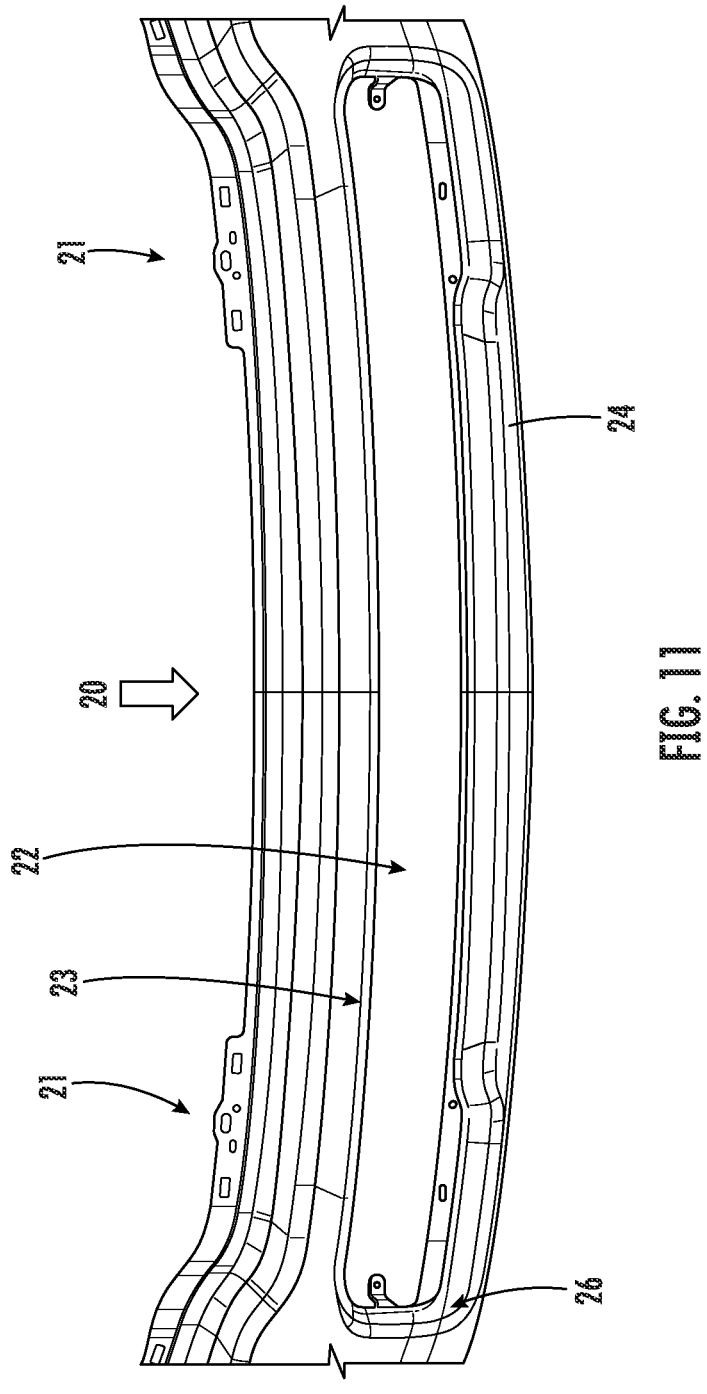
FIG. 11 is an upper perspective view of the bumper shell of the bumper assembly of FIG. 1, according to an exemplary embodiment.

Referring to FIG. 11, the bumper shell 20 is shown, according to an exemplary embodiment. In some embodiments, the bumper shell 20 may be a substantially annular member forming a central aperture 22. The bumper shell 20 may include a front face 24 and a rear face (depicted in FIG. 1). The bumper shell 20 may include an upper trim line 23 and a lower trim line 26. The upper trim line 23 and the lower trim line 26 may combine to form a curved profile extending radially inward and extending from the front face 24 of the bumper shell 20 towards the rear face 25 of the bumper shell 20. The bumper shell 20 may further include attachment points 21. The attachment points 21 may be used to couple the bumper shell 20 to a vehicle. In some embodiments, the attachment points 21 may be used to couple the bumper shell 20 to a vehicle by way of mechanical attachments. In other embodiments, the attachment points 21 may be used to couple the bumper shell 20 to a vehicle by way of a series of push-to-fit barbs included on a vehicle. In some embodiments, the bumper shell 20 may be formed as a single component. For example, the bumper shell 20 may be constructed via injection molded as a single, monolithic piece. As another example, the bumper shell 20 may be constructed by way of additive manufacturing. In other embodiments, the bumper shell 20 may be formed as an assembly of two or more components. The bumper shell 20 may be made of any suitable material including, but not limited to, steel, aluminum, plastic, rubber, fiberglass, carbon fiber, and other materials. In some embodiments, the bumper shell 20 may be made of steel and therefore not be subject to substantial flexing or deflection as a result of the various systems and methods described herein in regards to assembling the bumper assembly 10. In other embodiments, the bumper shell 20 may be configured to be at least partially flexible or subject to deflection, which may advantageously facilitate the various systems and methods regarding assembly of the bumper assembly 10 as provided herein.

Figure 12:
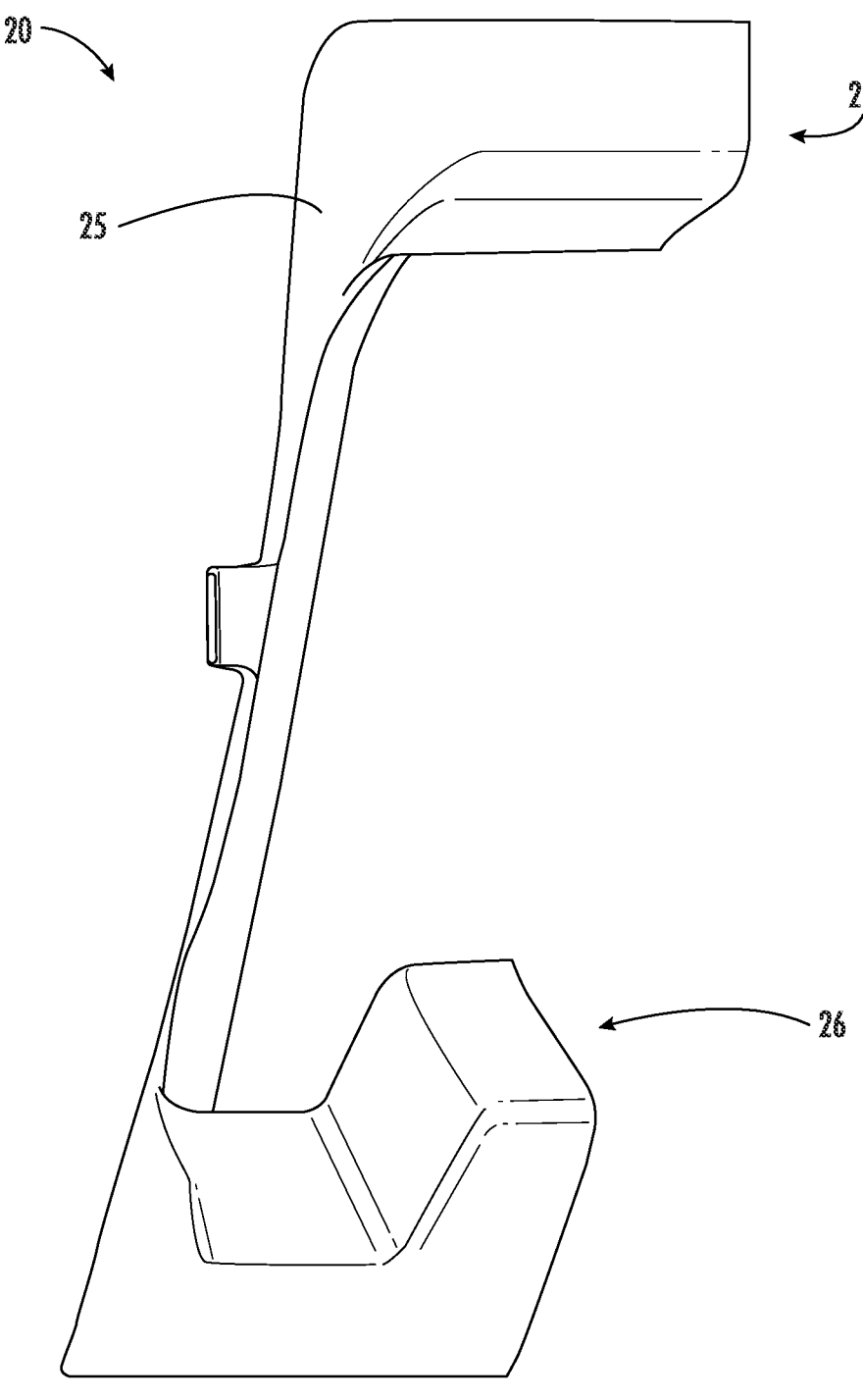
FIG. 12 is a side perspective cross-sectional view of the bumper shell of the bumper assembly of FIG. 1, according to an exemplary embodiment.

Referring to FIG. 12, a perspective side cross-sectional view of the bumper shell 20, according to an exemplary embodiment. As shown, the bumper shell 20 may be a thin-walled structure. As suggested above and shown in greater detail, the bumper shell 20 may include the upper trim line 23 and the lower trim line 26. The upper trim line 23 and the lower trim line 26 may combine to form a curved profile extending radially inward and extending from the front face 24 of the bumper shell 20 towards the rear face 25 of the bumper shell 20.

Figure 13:
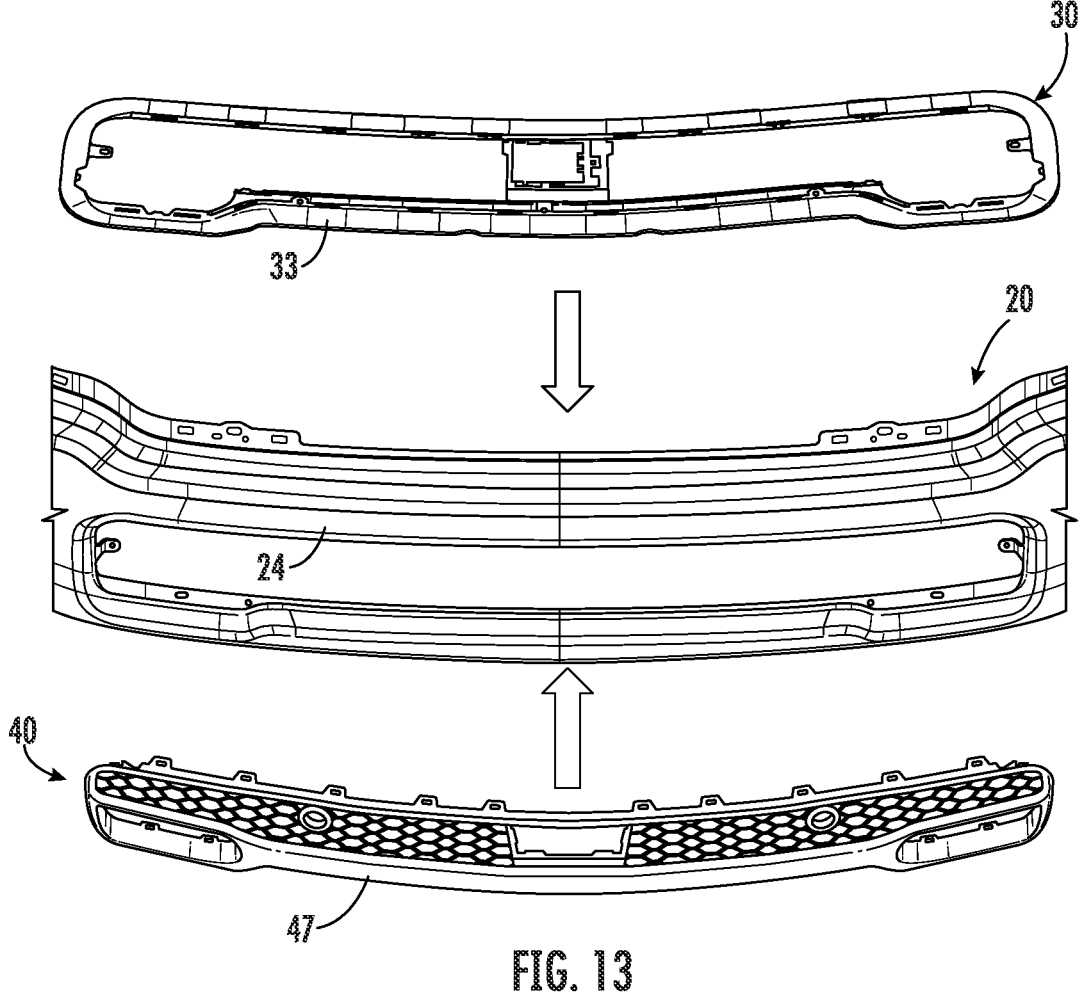
FIG. 13 is a schematic drawing showing an assembly process for the bumper assembly of FIG. 1, according to an exemplary embodiment.

Referring to FIG. 13, a schematic diagram showing an assembly process for the bumper assembly 10 is shown, according to an exemplary embodiment. As shown, the front-loaded component 40 may be applied to a front side (e.g., the front face 24) of the bumper shell 20 while the retention member 30 may be applied to a rear side (e.g., the rear face 25) of the bumper shell 20. As discussed in greater detail below, the retention member 30 may be coupled to the front-loaded component 40 by way of various retaining features and receiving fingers, which in turn may cause various surface-to-surface engagements between the (a) the bumper shell 20 and the front-loaded component 40 and (b) the bumper shell 20 and the retention member 30, thus providing an engagement that holds the bumper shell 20 at least partially between the front-loaded component 40 and the retention member 30.

Figure 14:
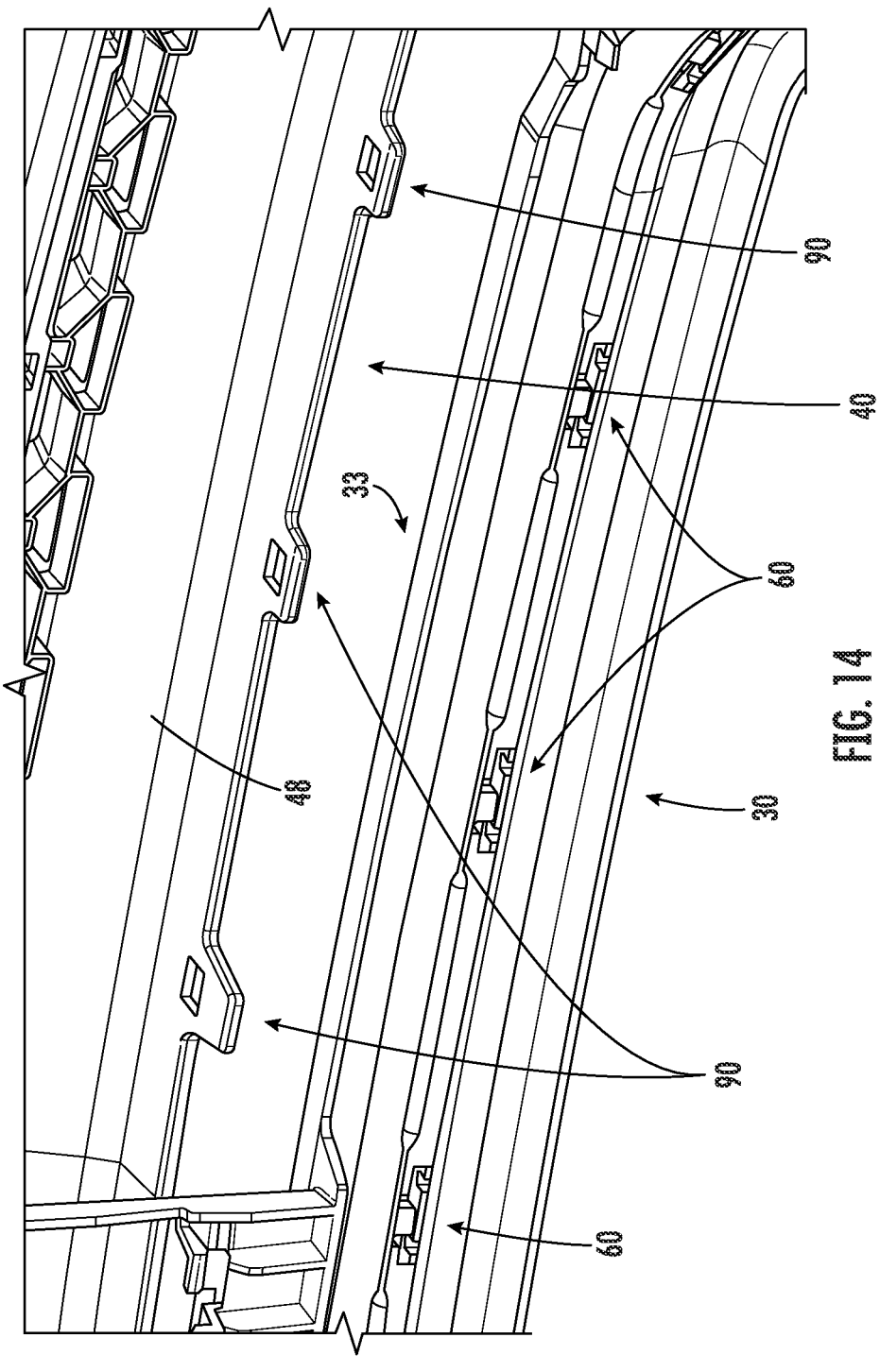
FIG. 14 is a perspective view showing the retention member of the bumper assembly of FIG. 1 interacting with the front-loaded component of the bumper assembly of FIG. 1, according to an exemplary embodiment.

Referring to FIG. 14, a perspective view of the retention member 30 interacting with the front-loaded component 40 is shown, according to an exemplary embodiment. For example, the retention member 30 may interact with the front-loaded component 40 as part of an assembly process suggested above in regards to FIG. 14. In some embodiments, the lower retaining features 60 of the retention member 30 engage the lower receiving fingers 90 of the front-loaded component 40. As described in greater detail below in regards to FIG. 16, some or all of the lower retaining features 60 may receive some or all of the lower receiving fingers 90, creating a fixed point of coupling at each point of connection between the lower retaining features 60 and the lower receiving fingers 90. While not shown, it should be appreciated that, in turn, the upper retaining features 50 of the retention member 30 may also engage the upper receiving fingers 80 of the front-loaded component 40 to provide a similar coupling effect.

Figure 15:
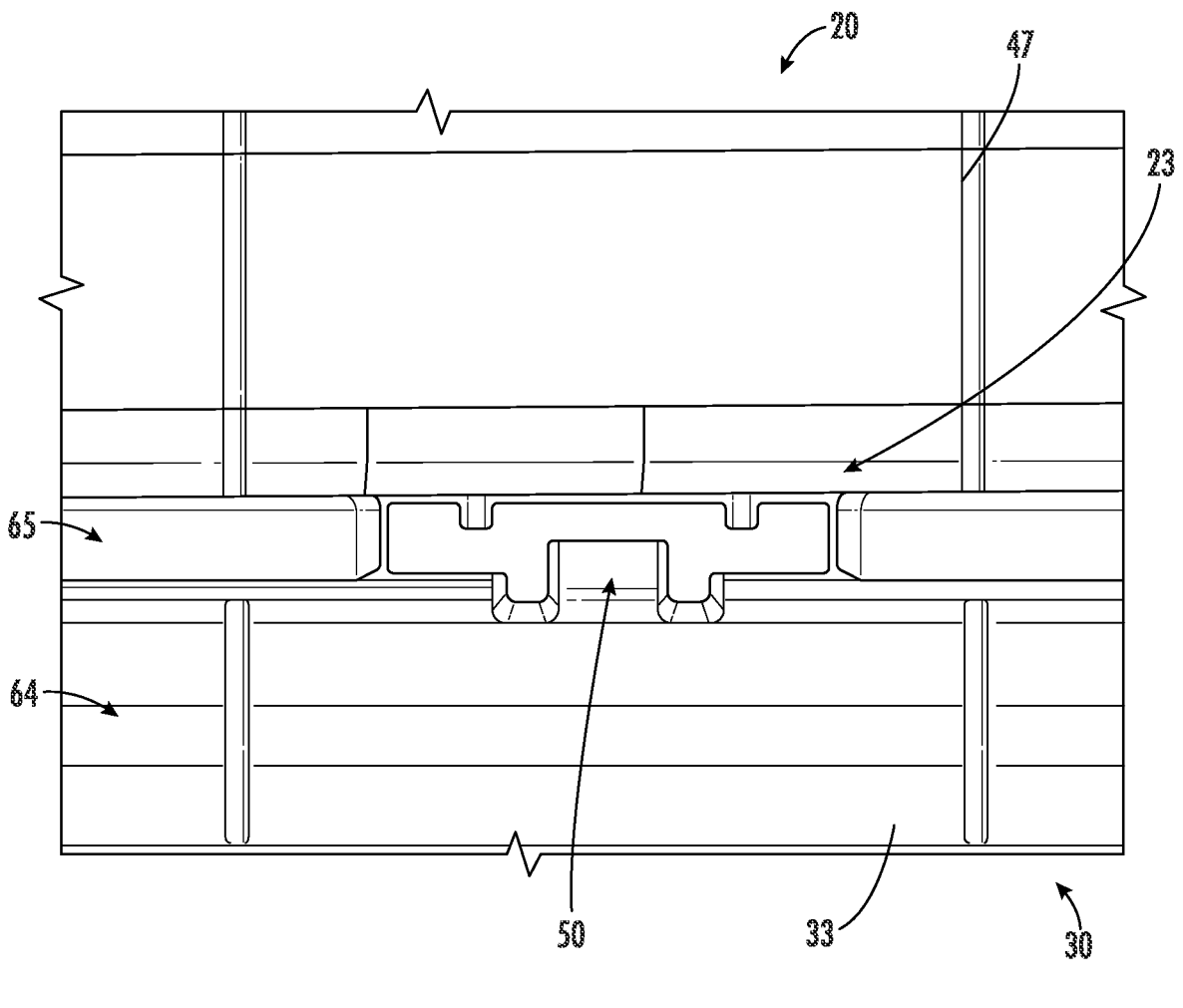
FIG. 15 is a front view showing the retention member of the bumper assembly of FIG. 1 interacting with the bumper shell of the bumper assembly of FIG. 1, according to an exemplary embodiment.

Referring to FIG. 15, the retention member 30 is shown interacting with the bumper shell according to an exemplary embodiment. As shown, and as described in greater detail below in regards to FIG. 16, the bumper shell 20 may engage with the retention member 30 such that the upper trim line 23 of the bumper shell 20 is positioned substantially in line with the annular channel 65.

Figure 16:
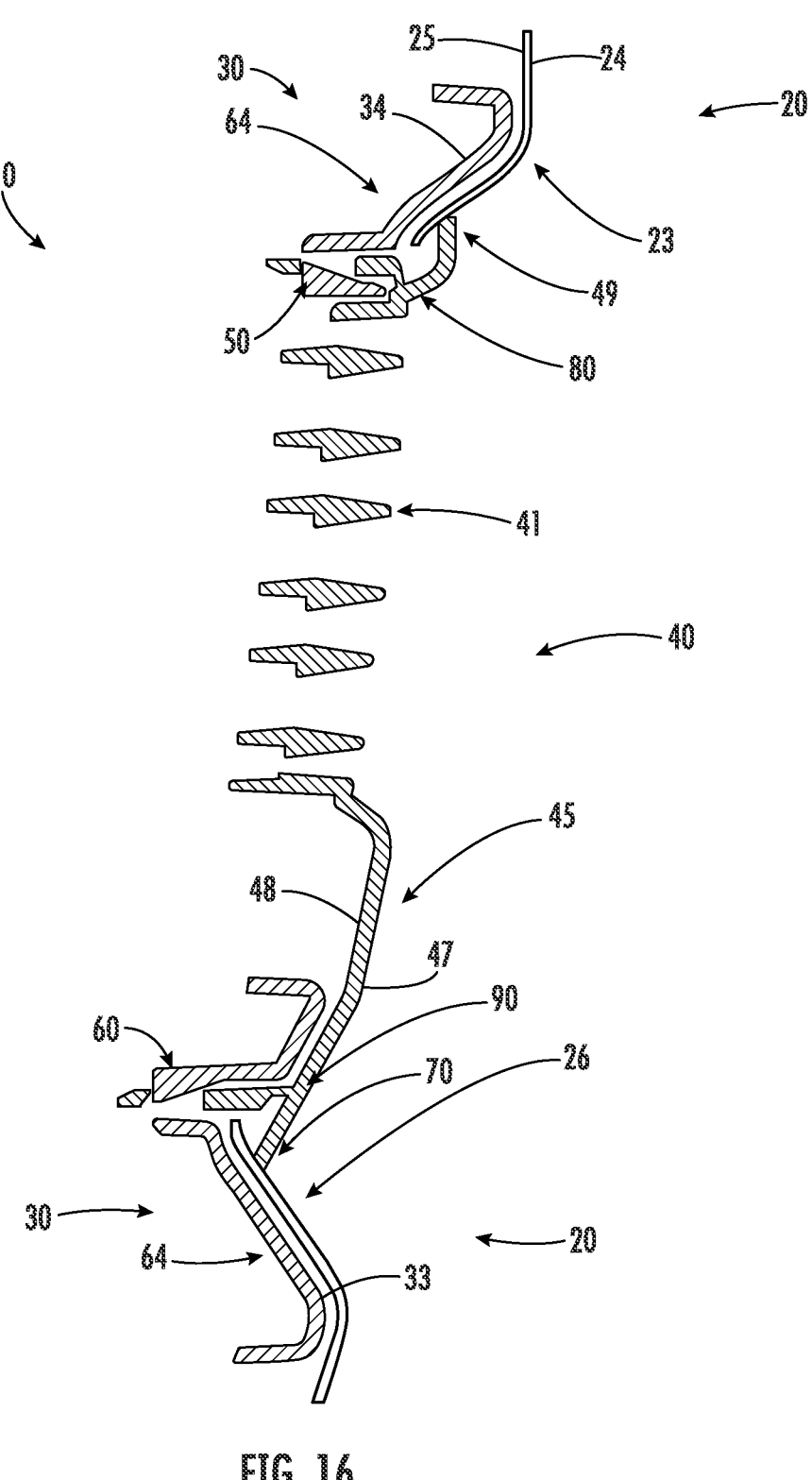
FIG. 16 is a side cross-sectional view of the bumper assembly of FIG. 1, according to an exemplary embodiment.

Referring to FIG. 16, a side cross-sectional view of the bumper assembly 10 is shown, according to an exemplary embodiment. FIG. 16 is a cross-sectional view of the bumper assembly 10 shown in FIG. 1, taken across line 16-16. The upper edge 49 of the front-loaded component 40 may engage the upper trim line 23 of the bumper shell 20 on the front face 24 of the bumper shell 20. Similarly, the lower edge 70 of the front-loaded component 40 may engage the lower trim line 26 of the bumper shell 20 on the front face 24 of the bumper shell 20. Accordingly, the front-loaded component 40 may be positioned to produce a bias, (e.g., force, pressure, contact, friction, etc.) in the direction of the rear face 25 of the bumper shell 20 via contact between the upper trim line 23 and the lower trim line 26, and the upper edge 49 and the lower edge 70, respectively. As described in greater detail below, such bias may be produced as a result of structures configured to bias the front-loaded component 40 in the direction of the rear face 25 of the bumper shell 20.

Still referring to FIG. 16, the bias applied by the front-loaded component 40 on the bumper shell 20 in the direction of the rear face 25 of the bumper shell 20 may interact with a bias applied by the retention member 30 on the bumper shell 20 in the direction of the front face 24 of the bumper shell 20, therefore holding the bumper shell 20 in place. In some embodiments, the annular profile 64 of the retention member 30 may be positioned to engage the upper trim line 23 and the lower trim line 26 of the bumper shell 20 on the rear face 25 of the bumper shell 20. As shown, and as suggested above, the annular profile 64 may form a profile substantially parallel to a profile formed by the upper trim line 23 and the lower trim line 26. In this sense, the retention member 30 may be configured to apply a bias on the bumper shell 20 in the direction of the front face 24 of the bumper shell 20. As described in greater detail below, such bias may be produced as a result of structures configured to bias the retention member 30 in the direction of the front face 24 of the bumper shell 20.

Still referring to FIG. 16, the various biases exerted on the bumper shell 20 via the retention member 30 and the front-loaded component 40 may be enacted due to engagement between (a) the upper retaining features 50 of the retention member 30 and the upper receiving fingers 80 of the front-loaded component 40, and (b) the lower retaining features 60 of the retention member 30 and the lower receiving fingers 90 of the front-loaded component 40. By way of example, with additional reference to FIGS. 3A and 10A, the lower receiving fingers 90 may be inserted into the lower retaining features 60. During the assembly process suggested above in regards to FIG. 13, the lower receiving fingers 90 may be inserted into the apertures 61 of the lower retaining features 60 until the barbs 75 are positioned substantially within the apertures 81 of the lower receiving fingers 90. Once the barbs 75 are positioned substantially within the apertures 81, the upper protrusions 62 of the lower retaining features 60 may engage the upper surfaces 83 of the lower receiving fingers 90. Similarly, the lower surface 84 of the lower receiving fingers 90 may be held against the lower surfaces 69 of the lower retaining features 60. The insertion of the lower receiving fingers 90 into the lower retaining features 60 may include frictional passage of the lower receiving fingers 90 into the lower retaining features 60 and may be accomplished by minor deflection of the barbs 75 and/or the upper protrusions 62 until the barbs 75 are positioned within the apertures 81. Such frictional and/or deflective passage may be facilitated by the chamfer tips 82 of the lower receiving fingers 90. Once the lower receiving fingers 90 are inserted into the lower retaining features 60, the lower receiving fingers 90 may be held substantially in place, thus maintaining the position of the front-loaded component 40 with respect to the retention member 30. In various embodiments, the upper receiving fingers 80 of the front-loaded component may be inserted into the upper retaining features 50 of the retention member 30. In this sense, the retention member 30 may engage the front-loaded component 40 to (a) hold the lower edge 70 of the front-loaded component 40 against the lower trim line 26 of the bumper shell 20 and (b) hold the upper edge 49 of the front-loaded component against the upper trim line 23 of the bumper shell 20. At the same time, the annular profile 64 may be (a) held against the upper trim line 23 on the rear face 25 of the bumper shell 20 and (b) held against the lower profile 45 on the rear face 48 of the front-loaded component 40. Thus, the retention member 30, the bumper shell 20, and the front-loaded component 40 may be held in place relative to one another.

Still referring to FIG. 16, in some embodiments, this arrangement may result in a compressive force on the retention member 30. Specifically, regions of the retention member 30 substantially formed by the upper retaining features 50 and the lower retaining features 60 may be forced against regions substantially formed by the annular profile 64. The upper retaining features 50 and the lower retaining features 60 may be held in place due to their engagement with the upper receiving fingers 80 and the lower receiving fingers 90, while the annular profile 64 may be slightly compressed toward the rear face 34 of the retention member 30 due to the engagement between the annular profile 64 and the upper trim line 23 of the bumper shell 20 and the lower profile 45 of the front-loaded component 40.

Referring again to FIG. 1, the various systems and methods herein, particular in regards to the discussion in regards to FIGS. 13 and 16, may result in the assembled bumper assembly according to some embodiments.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "example" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that the construction and arrangement of the bumper assembly and retainer member as shown in the various example embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. Any element disclosed in one embodiment may be incorporated or utilized with any other embodiment disclosed herein. Although one example of an element that can be incorporated or utilized in another embodiment has been described above, it should be appreciated that other elements of the various embodiments may be incorporated or utilized with any of the other embodiments disclosed herein.

What is claimed is:

1. A bumper assembly, comprising:
a retention member comprising a plurality of retaining features and a brace member, the brace member extending vertically between upper and lower portions of the retention member;
a front-loaded component comprising a plurality of receiving members and a central aperture; and
a bumper shell positioned substantially between the retention member and the front-loaded component;
wherein the plurality of retaining features are coupled to the plurality of receiving members such that the retention member and the front-loaded component engage the bumper shell; and
wherein the central aperture of the front-loaded component is configured to receive at least a portion of the brace member.

2. The bumper assembly of claim 1, wherein the bumper shell has a substantially annular shape and comprises a first central aperture.

3. The bumper assembly of claim 2, wherein the front-loaded component is configured to be positioned substantially within the first central aperture of the bumper shell.

4. The bumper assembly of claim 2, wherein the retention member is configured to be positioned substantially about a perimeter of the first central aperture of the bumper shell.

5. The bumper assembly of claim 1, wherein the retention member forms at least one of a substantially oblong shape or an annular shape.

6. The bumper assembly of claim 1, wherein the retention member is made of plastic, rubber, fiberglass, or carbon fiber.

7. The bumper assembly of claim 1, wherein the front-loaded component is configured to be coupled to an exterior of a vehicle.

8. The bumper assembly of claim 1, wherein the front-loaded component further comprises a grille texture.

9. The bumper assembly of claim 1, wherein the front-loaded component is made of plastic, rubber, fiberglass, carbon fiber, or steel.

10. The bumper assembly of claim 1, wherein the front-loaded component further comprises a plurality of upper receiving fingers and a plurality of lower receiving fingers.

11. The bumper assembly of claim 1, wherein the bumper shell further comprises a plurality of attachment points configured to couple the bumper shell to a vehicle.

12. The bumper assembly of claim 1, wherein the bumper shell is made of steel, aluminum, plastic, rubber, fiberglass, or carbon fiber.

13. A retention member for coupling a front-loaded component to a bumper shell, comprising:

a plurality of retaining features configured to engage a plurality of receiving members coupled to the front-loaded component such that an upper surface of the front-loaded component engages a front upper surface of the bumper shell and a lower surface of the front-loaded component engages a front lower surface of the bumper shell;

an upper profile configured to engage a rear upper surface of the bumper shell; and a lower profile configured to engage a rear lower surface of the bumper shell;

wherein the retention member is configured to hold the front-loaded component against the bumper shell;

wherein the retention member comprises a brace member extending vertically between upper and lower portions of the retention member; and wherein the front-loaded component comprises a central aperture configured to receive at least a portion of the brace member.

14. The retention member of claim 13, wherein the retention member forms at least one of a substantially oblong shape or an annular shape.

15. The retention member of claim 13, wherein the retention member further comprises a brace member, wherein the brace member extends vertically between a lower portion of the retention member and an upper portion of the retention member.

16. The retention member of claim 13, wherein the retention member is made of plastic, rubber, fiberglass, or carbon fiber.

17. The retention member of claim 13, wherein the plurality of retaining features comprise a plurality of upper protrusions, a plurality of lower channels, and a barb.

18. A method of assembling a bumper assembly, comprising:

providing a retention member that includes a plurality of retaining features and a brace member, the brace member extending vertically between upper and lower portions of the retention member;

providing a front-loaded component that includes a plurality of receiving members and a central aperture, the central aperture configured to receive at least a portion of the brace member;

providing a bumper shell;

applying the retention member to a rear face of the bumper shell;

applying the front-loaded component to a front face of the bumper shell; and coupling at least one of the plurality of receiving members to at least one of the plurality of retaining features;

wherein the front-loaded component engages the front face of the bumper shell, the retention member engages the rear face of the bumper shell, and the bumper shell is held substantially between the plurality of retaining features and the front-loaded component.

* * * * *